May 11, 1926.

H. M. SWARTLEY 1,584,489

WEIGHING DEVICE FOR VEHICLES

Filed Nov. 8, 1924.

Inventor
Harry M. Swartley
By W.W.Williams

May 11, 1926.
H. M. SWARTLEY
WEIGHING DEVICE FOR VEHICLES
Filed Nov. 8, 1924
1,584,489
2 Sheets-Sheet 2
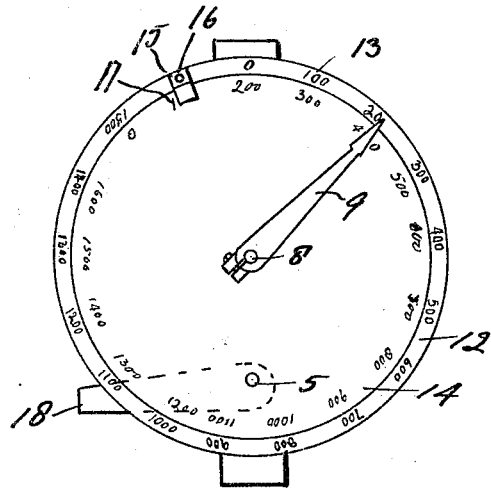

Patented May 11, 1926.

1,584,489

UNITED STATES PATENT OFFICE.

HARRY MINSTER SWARTLEY, OF PHILADELPHIA, PENNSYLVANIA.

WEIGHING DEVICE FOR VEHICLES.

Application filed November 8, 1924. Serial No. 748,559.

My invention relates to a new and useful improvement in weighing devices for vehicles, and has for its object to so construct such a device that it may be readily attached to the underside of the body of a truck or other vehicle and the operating mechanism connected to the axle or some part carried thereby so that movement of the body relative to the axle caused by the loading of said body will operate the weighing mechanism to indicate the weight of the load.

A further object of the invention is to provide for indicating the weight of the truck and includes this weight in the indications of the load weight so as to give the total weight of the truck and load.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 3, is an enlarged face view of the device.

Fig. 4, is a rear view of Fig. 3.

Fig. 5, is an edge view of Fig. 4.

Figure 1:
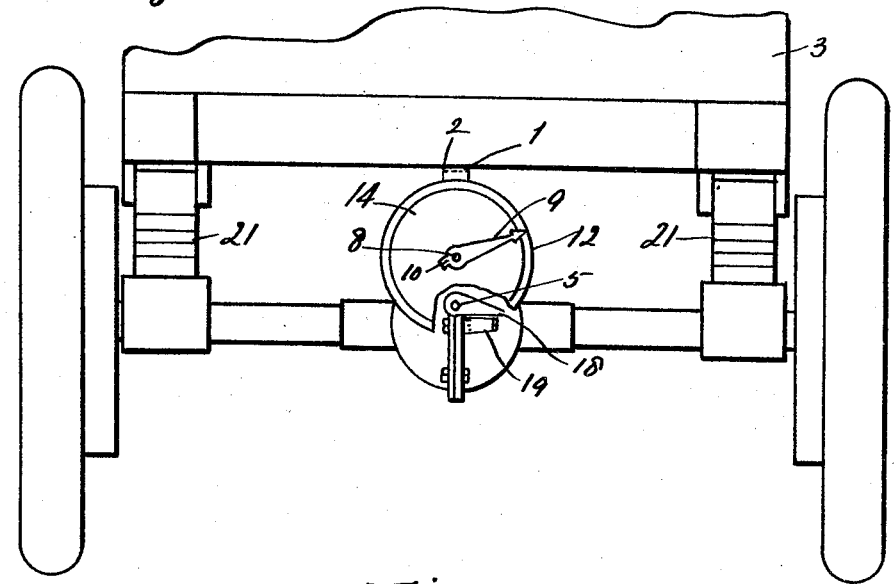
Fig. 1, is a rear view of a truck showing the weighing device in operative position.
Figure 2:
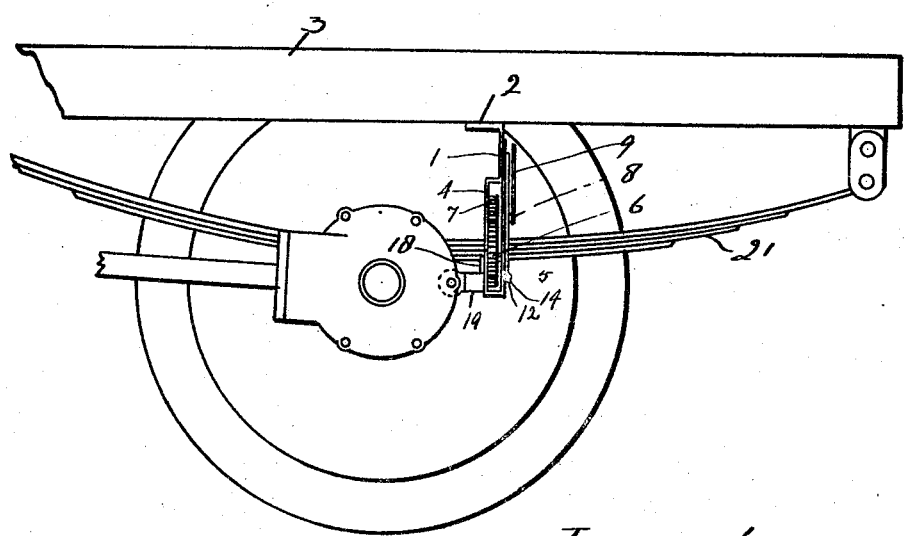
Fig. 2, is a side view of a portion of a truck showing an edge view of the weighing device.

In carrying out my invention as here embodied, 1 represents a bracket having an angular section 2 by which it may be secured to the underside of the body 3 of a truck or other vehicle, and this bracket has formed therewith or secured thereto the offset strip 4, the bracket and strip forming the frame of the device upon which the operating parts of the device are mounted.

5 represents a short shaft journalled in the frame and having secured thereto a gear wheel 6 which latter meshes with the pinion 7 secured upon the short shaft 8. This last named shaft is also journalled in the frame and has secured upon its outer end the pointer 9, the means of securement preferably consisting of the split lug 10 having a screw 11 passing through one section thereof and threaded into the other section for clamping the pointer upon the shaft 8 which arrangement provides for the adjustment of the pointer independent of the shaft so as to calibrate the weighing device or set the pointer at zero on the main dial to compensate for the weight of the body.

12 represents the main or primary dial which is secured to the hanger 1 in any convenient manner and through which the shaft 8 projects and this dial carries the numbers 13 which numbers start at zero so that the movements of the pointer over this dial may be indicated and determined.

14 represents a secondary dial which is positioned concentric with the primary dial 12 and the shaft 8 also projects through this last named dial and said dial is held in its adjusted position by the clip 15 secured upon the primary dial by the screw 16. This secondary dial is provided with the indicating numbers 17 arranged around its edge and over which the pointer 9 moves so as to give a double indication by the movement of said pointer for the purpose hereinafter set forth.

Secured upon the inner end of the short shaft 5 is a lever 18 adapted to rest upon the axle or some member carried by said axle, as for instance, the bracket 19 which is here shown as secured to the gear casing carried by the axle and this lever preferably has a spiral spring 20 attached thereto in such manner that said lever will be normally held down against the bracket 19, thus obviating any necessity of attaching this lever to the bracket which leaves said lever a freedom of movement upon the bracket sufficient to accommodate or compensate for all the movements of the device relative to the axle. This arrangement also provides for the swinging of the lever out of contact with the bracket against the action of the spring so that it may be strapped or otherwise held out of action except when it is desired to weigh the load.

From the foregoing description the operation of my improvement will be obviously as follows:—

The bracket 1 being attached to the underside of the body and the lever 18 brought into contact with the upper edge of the bracket 19 the pointer will indicate the depression of the springs 21 or what is the equivalent will indicate the movement of the body relative to the axle of the vehicle, The pointer 9 should then be adjusted upon the shaft 8 so that it will register with zero upon the primary dial 12 after which any further depression of the springs 21 will be indicated upon the primary dial by the pointer registering with the number corresponding with this depression. From this it will be seen that the extent to which the body is loaded will be thus indicated and as the numbers 13 will represent pounds the load will be thus weighed.

When the device is first applied to the vehicle the entire weight of the vehicle should be determined and the secondary dial 14 adjusted upon the dial 13 so that the numbers 17 will indicate, as for example should the total weight of the vehicle be two thousand pounds the adjustment of the secondary dial will be such that the number two thousand will coincide with zero on the primary dial so that when the body of the vehicle is loaded the movement of the pointer 9 will not only indicate the weight of the load by registering with the numbers 13 on the primary dial but will also indicate the combined weight of the vehicle and its load by registering with the numbers 17 on the secondary dial. This is an important feature of my present improvement since it enables any one at a glance to know the total weight of the vehicle and load and thus determine whether the vehicle may without danger pass over certain bridges or other structures.

Of course I do not wish to be limited to the exact details of construction as herein shown as these may be varied within the limits of the appended claims without departing from the spirit of my invention.

Having thus fully described my invention, what I claim as new and useful is:—

1. The combination with a vehicle including a body and axle, of a frame carried by the vehicle body, a stationary dial having numerals thereon representing weights, a secondary dial rotatably mounted on the first mentioned dial and also having numerals thereon indicating weights and adapted to be manually rotated counterclockwise, a pointer movable over both dials, whereby the load in the vehicle and said load plus the weight of the vehicle are simultaneously indicated, a spring actuated lever coacting with the axle, and a gear train to transmit motion from said lever to the pointer.

2. The structure set forth in claim 1 in connection with means carried by the first mentioned dial and co-operating with the last mentioned dial to hold the latter in different adjusted positions.

In testimony whereof, I have hereunto affixed my signature.

HARRY MINSTER SWARTLEY.